United States Patent [19]

Nugent

[11] Patent Number: 4,526,687
[45] Date of Patent: Jul. 2, 1985

[54] RESERVE PIT WASTE TREATMENT SYSTEM

[75] Inventor: James E. Nugent, Lafayette, La.

[73] Assignee: Water & Industrial Waste Laboratories, Inc., Lafayette, La.

[21] Appl. No.: 544,520

[22] Filed: Oct. 24, 1983

Related U.S. Application Data

[63] Continuation of Ser. No. 357,789, Mar. 12, 1982, abandoned, which is a continuation of Ser. No. 119,815, Feb. 8, 1980, abandoned.

[51] Int. Cl.$^3$ .......................... C02F 1/52; B01D 21/08
[52] U.S. Cl. .................................... 210/202; 210/205; 210/208; 210/237; 210/241; 210/521; 175/206
[58] Field of Search .................. 175/66, 206; 210/702, 210/714, 738, 195.1, 199, 205, 207, 208, 219, 237, 249, 260, 241, 541, 542, 202, 521

[56] References Cited

U.S. PATENT DOCUMENTS

| | | | |
|---|---|---|---|
| 2,110,721 | 3/1938 | Fischer | 210/738 |
| 2,429,316 | 10/1947 | Green | 210/208 |
| 3,306,449 | 2/1967 | Minegishi | 210/207 |
| 3,353,676 | 11/1967 | Hirsch | 210/208 |
| 3,397,139 | 8/1968 | Sak | 210/609 |
| 3,487,017 | 12/1969 | Thorn et al. | 210/208 |
| 3,764,011 | 10/1973 | Owens | 210/199 |
| 3,951,806 | 4/1976 | Young | 210/208 |
| 4,054,514 | 10/1977 | Ohmann | 210/208 |
| 4,069,143 | 1/1978 | Friesenborg et al. | 210/532.1 |
| 4,142,970 | 3/1979 | von Hagel et al. | 210/208 |
| 4,366,063 | 12/1982 | O'Conner | 210/241 |
| 4,367,145 | 1/1983 | Simpson et al. | 210/241 |

Primary Examiner—Peter Hruskoci
Attorney, Agent, or Firm—Charles C. Garvey, Jr.

[57] ABSTRACT

A chemical mixing apparatus comprises a preferably cylindrical mixing tank having a flow inlet at the lower bottom central portion of the tank, the flow inlet providing an injection conduit which proceed vertically a distance into the tank. A floc concentration tube is provided with an inner bore, the tube being vertically mounted in the tank about the injection conduit with the tube having a lower fluid inlet and an upper fluid outlet, the fluid inlet being in communication with the tank by means of a plurality of perforations in the tube at the fluid inlet adjacent the bottom of the tank. A rotatable propeller shaft having a mixing propeller mounted thereon is attached to the tank structure, the shaft being mounted at least in the tube bore above the injection conduit with the propeller being between the lower fluid inlet and the upper outlet immediately adjacent the outlet of the injection conduit. A cylindrical shroud baffle having a diameter greater than the diameter of the tube is mounted within the tank at the upper fluid outlet and surrounding the fluid outlet of the tube. The baffle provides upper and lower edge portions projecting respectively a distance above and below the fluid outlet. The tube provides a floc concentration chamber which surrounds the point of injection of the waste stream entering the tank together with chemicals which are injected to enhance formation of floc in a manner which enhances recirculation and therefore floc build-up.

8 Claims, 3 Drawing Figures

RESERVE PIT WASTE TREATMENT SYSTEM

This is a continuation of application Ser. No. 357,789, filed Mar. 12, 1982, entitled "Reserve Pit Waste Treatment System," presently abandoned which application is a continuation of prior application, U.S. Ser. No. 119,815 filed Feb. 8, 1980, presently abandoned.

BACKGROUND OF THE INVENTION

1. Field of the Invention

The present invention relates to waste water treatment systems and more particularly relates to drilling mud reclamation from oil or gas well reserve pit water, wherein the water cleanup process and drilling mud reclamation are performed simultaneously.

2. General Background and Prior Art

In the process of drilling in oil or gas well, it has been a standard practice to erect what is known in the art as a "reserve pit" for storing formation cuttings as well as drilling mud and water spills which occur during the drilling operation.

These spills consist of the waste water spills from oil and gas well drilling operations consist of a number of undesirable compositions, such as chlorides, chronium, zinc, organic or inorganic carbons, and othersuch parameters that cause the waste stream to have a high chemical oxygen demand.

Reserve pits vary in size depending on the depths of the well to be drilled and the length of drilling time anticipated. They may for example cover an area of two square in size.

During the drilling operation, all the fluids spill regardless of their nature are captured and stored in the reserve pit and allowed to accumulate until drilling is completed. Fluid at that time may be disposed of in various manners such as pumping into trucks for removal to dumping sites, burning, or any other types of untreated waste disposal. In fact, a wholesale dumping of the waste into streams and rivers at night when detection by authorities is not reliable has been a problem.

Thus, there is a need for a method of disposing of the waste stream which can process the waste materials in the waste stream removing them from the stream. It will be preferable that the system of cleaning constantly and continuously remove waste materials from the water as the drilling progresses rather than after the entire operation as is presently the case.

It should be understood that a large amount of drilling mud accumulates in the waste stream which is pumped to the reserve pit during drilling operation. Drilling muds which are generically as "barites" are quite extensive and must be purchased by the driller for use in the drilling operation. The reclamation of the costly drilling muds or "barites" on the actual drilling site as the drilling is progressing would be desirable. In this manner, a pollution of streams and rivers adjacent the drilling site would not be a problem and the driller could reclaim the barites and recycle them during the drilling operation instead of having to continuously purchase drilling mud as the well progresses and not recovering any drilling muds until the entire well was completed.

Indeed, it is present practice that the drilling mud be allowed to mix into the waste stream and be collected in the reserve pit and be therefore lost as waste never to be recovered.

In addition to the barites or drilling mud in the waste water stream generated by oil and gas drilling, there is seen as above mentioned several other parameters such as oil, grease, suspended solids, chlorides, chromium, zinc, organic and inorganic compounds and the like.

GENERAL DISCUSSION OF THE PRESENT INVENTION

The present invention solves these prior art problems and shortcomings in a simple and inexpensive manner. The present invention provides a waste treatment system for use with oil and gas well drilling installations where the cleanup process i.e. removing undesirable waste material from the waste stream generated by the oil/gas well and the reclamation of desirable necessarily extensive barites are done simultaneously. The present invention provides a chemical mixing apparatus having a mixing tank with a flow inlet at the bottom central portion adapted to receive a fluid stream into the tank. A floc concentration tube provides an inner bore with the tube being vertically in the tank. The tube has a lower fluid inlet and an upper fluid outlet with the fluid inlet communicating with the remainder of the tank at the lower portion of the tube. A plurality of perforations are provided to allow the tube at the fluid inlet to communicate with fluids in the tank.

A rotatable propeller shaft is supported above the tank and provides a mixing propeller mountable within the tube.

A shroud baffle mounted within the tank at the upper fluid outlet surrounds the outlet of the tube, the baffle providing upper and lower edge portions projecting respectively a distance above and below the fluid outlet. The construction of the mixing apparatus provides a desirable recirculation rate of a minimum of three and a maximum of seven.

The mixer cooperates with an overall treatment unit providing an inlet line which is equipped with, for example, flow meters to measure the water pump to the unit. The water is blended proportionally with feed chemicals pumped by, for example, electronic metering pumps which are furnished with a record of the fluids being treated.

Water is pulled into the mixing tank through the flocculator blades of the propeller where the floc particles are further mixed. The stream then flows over the top of the draft tube and is pulled down between the draft tube and the baffle and reenters the draft tube repeating the process on the order of a recirculation of three to seven times. This recirculation method and apparatus provides enhanced buildup of floc necessary for the treatment of oil and gas well waste streams is discharged normally into reserve pits.

Excess water flows from the mixing tank through lines to a treatment tank weir-trough where additional chemicals can be added as desired. The weir-trough is so designed that the flow is evenly distributed over the entire width of the settling tank. A primary settling tank provides sloped bottom portions which are divided into two sections. A baffle forms the division between the sub tank sections.

The placement of the baffle and the design of the tank as hereinafter described creates a desirable rolling action of the floc to further enhance floc size and a deposition of 60% to 70% of the floc are solids.

Sludge is removed by the use of a blowoff valve through, for example, the four inch (4") outlet which is installed on the bottom center side of the settling tank.

The sludge blowoff valves are, for example, two inches (2") in size and blown off automatically by a sludge blowoff timer.

Water leaving the primary settling tank passes through wooden baffles into the secondary settling tank which has a retention time of for example forty minutes and measures for example ten feet long, 7½ feet wide by 8 feet deep.

The settling tank is designed with a sloping bottom for sludge removal identical to the primary settling tank.

A sludge removal system consists of a plurality of connected headers spaced evenly over the bottom of the tank with a drain sludge collection line which can be either air or water purged and operated either manually or automatically.

A manually operated oil skimmer is installed in the primary and secondary clarifier for oil removal where the oil can be drawn off into a temporary storage tank.

The oil is drawn off by such a manual means and containerized. The clear water can be pumped into the inlet flow line of the unit further processing and removal of solids, metals, and chemical oxygen demand.

The sludge blowoff from the primary and secondary treatment zones by gravity are pumped to sludge thickener before the water removal takes place. Water removed from this sludge is returned to the inlet flow line to the unit. The sludge from the sludge thickener is sent to a mud saver where cleaning of the mud takes place.

If water is high in chlorides, they are reduced by a blending operation as controlled by compound loop system water entering into a salinity control tank is first metered by a signal sent to the inlet valve on the fresh water line for regulation of flow. The chloride probe on the chloride detector measures the chloride within set limits and sends a signal to override the inlet valve position. A pH probe installed in the pH correction tank transmits a signal either to the acid pump carbon dioxide feeder, or a base feeder to maintain proper pH.

The mud which has settled to the bottom of the tank is returned to the drilling rig for immediate use. This cuts drilling cost considerably as expensive drilling mud is not lost as has been the practice in the prior art using larger (for example several acre) reserve pits where mud is never to be reclaimed, but is usually dumped as waste water.

A small temporary reservoir having for example a one-eighth or roughly, ten percent (10%) size of the usual larger reserve pit is used with the present invention thus reducing the costs of construction of the larger reserve pits as used by the prior art.

In cases where oil wells have already been drilling and large reserve pits are standing full of waste fluids, the apparatus of the present invention utilizing the method of the present invention also does an excellent job of mud, chemical, and water separation where mud is allowed to dry and be plowed under.

Thus, it is an object of the present invention to provide a waste treatment for use with oil and gas wells which treats the waste stream created by the oil and gas well drilling operations, returning the drilling muds or barites to the rig for recycled use.

It is another object of the present invention to provide a waste treatment system for use in treating waste water produced by oil and gas wells during the drilling operation which unit can remove a plurality of undesirable waste material such as oil, grease, suspended solids, chlorides, chromium, zinc, organic, and inorganic carbons and like parameters from the waste water stream.

It is another object of the present invention to provide a waste treatment system which can be quickly and easily added to existing oil or gas well drilling structures for treating the waste streams generated.

It is another object of the present invention to provide a waste treatment system which eliminates the need for large several acre reserve pits.

Another object of the present invention is to provide a waste treatment system having a chemical mixing apparatus which provides enhanced recirculation of the floc having a recirculation rate of between three and seven.

Another object of the present invention is to provide a waste treatment system which can remove desirable barites continuously from the waste stream as it is produced by the oil or gas well drilling operation.

Another object of the present invention is to provide an apparatus which can easily remove waste materials from existing reserve pit reservoirs.

BRIEF DESCRIPTION OF THE INVENTION

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
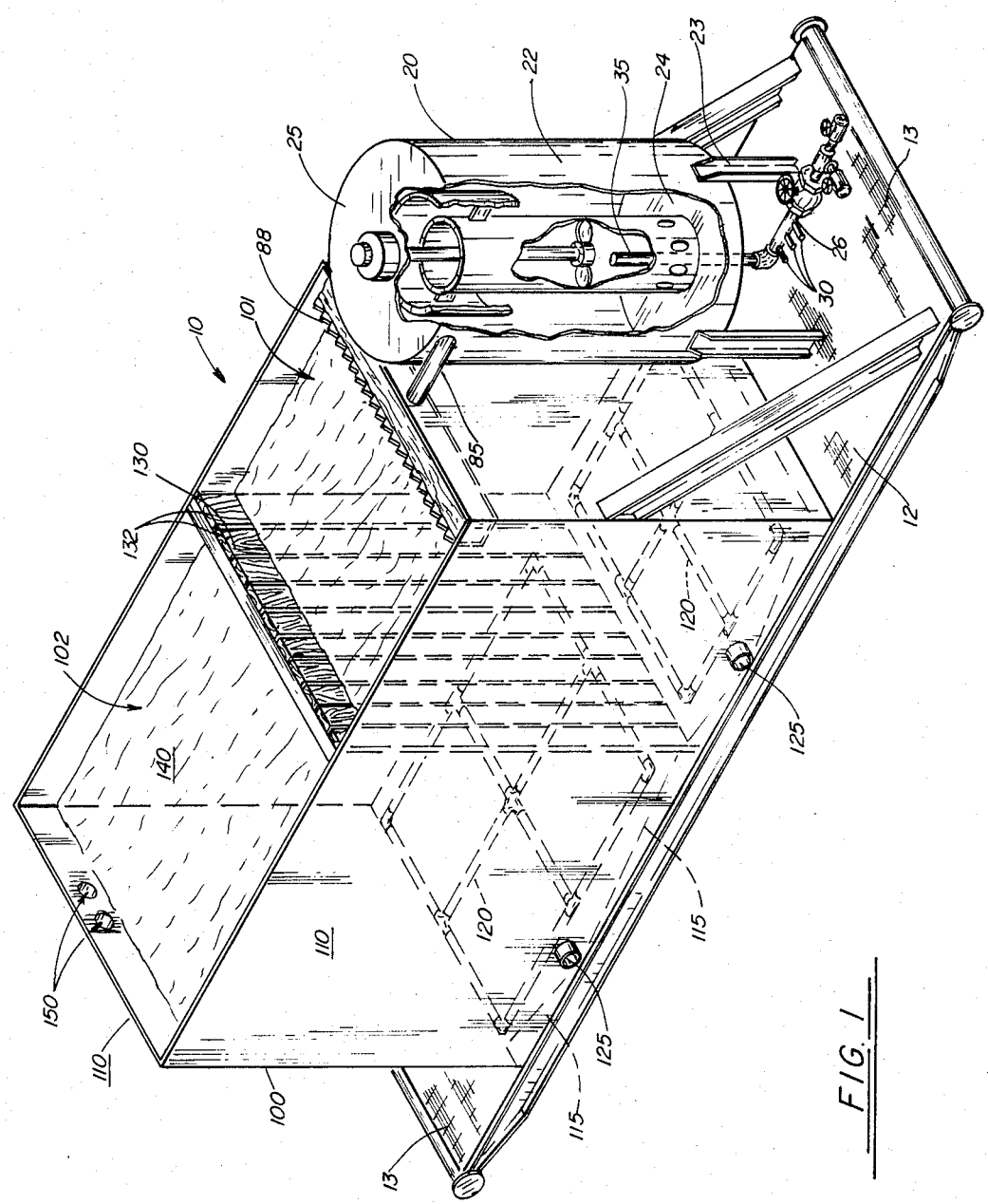
FIG. 1 is a perspective view of the preferred embodiment of the apparatus of the present invention.

FIG. 1 best shows the preferred embodiment of the apparatus of the present invention designated generally by the numeral 10.

In FIG. 1 there is provided a structural sled 12 which could be for example welded steel construction having a plate steel or steel grating deck 13 portion.

Mounted upon sled 12 is chemical mixer 20 and clarifier 50 having primary 101 and secondary 102 subsections.

Mixer 20 (FIG. 2) provides mixing tank 22 supported, for example, by a plurality of legs 23 and having bottom 24 and top 25 portions. In the preferred embodiment, tank 22 is cylindrical having flat bottom 24 and top 25 portions. A flow inlet 26 is provided at the lower portion of tank 22 being mounted, for example, upon the deck 13 of sled 12. Flow inlet 26 can be any conventional piping assembly, as shown, and is equipped with a plurality of chemical injection lines 30. Injection lines 30 are provided before fluid is transmitted into tank 22. Typically flocculation agents will be injected at lines 30 to the waste stream being added to mixer 20.

A substantially vertical conduit riser 35 connects with flow inlet 26 to provide a conduit injection into tank 22. Note that conduit 35 proceeds into tank 22 a distance above tank bottom 24.

Figure 2:
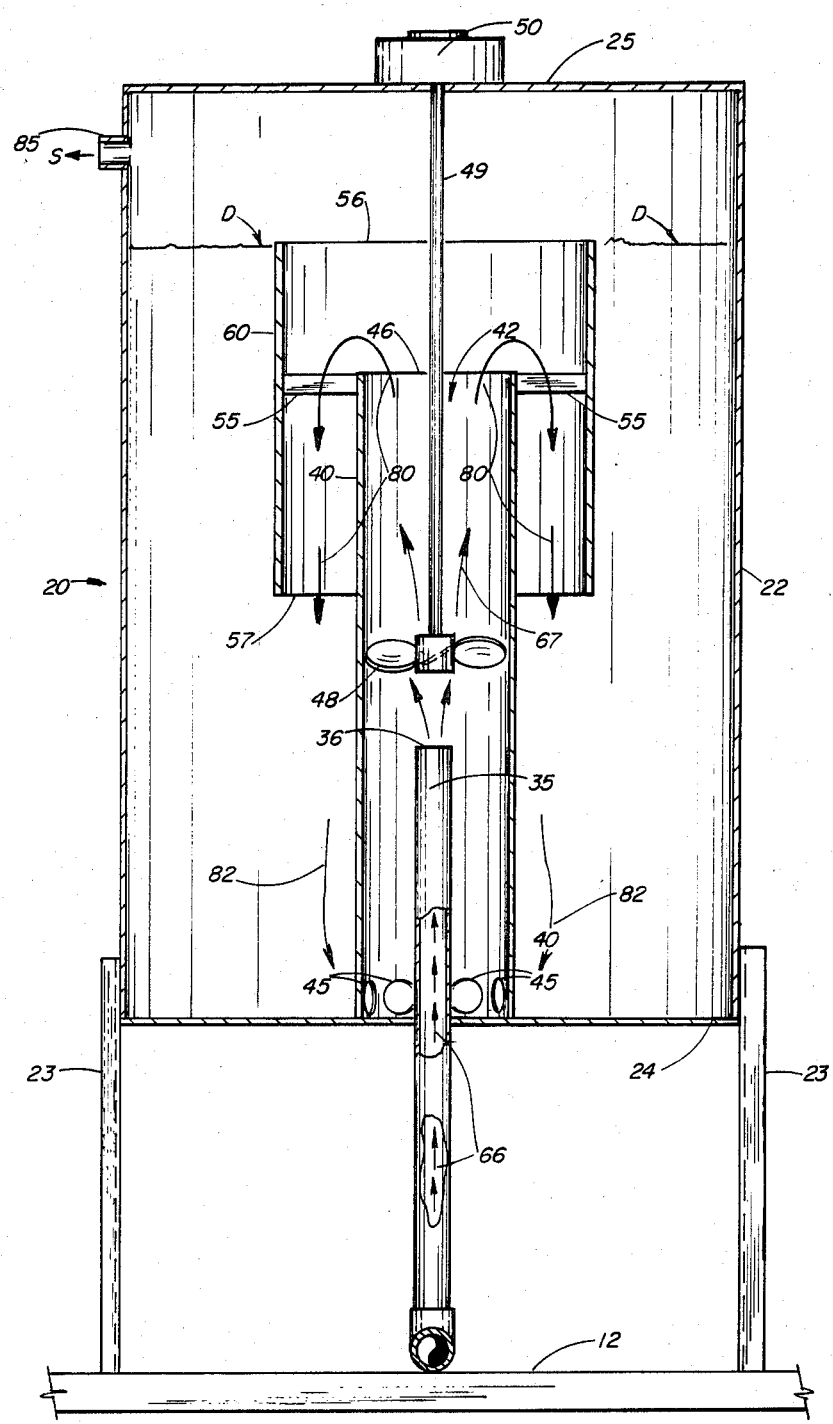
FIG. 2 is a sectional front view of the chemical mixture portion of the preferred embodiment of the apparatus of the present invention.

A floc concentration tube 40 can be seen best in FIGS. 1 and 2. Floc concentration tube 40 is preferably cylindrical providing an inner bore 42 of substantially equal cross sectional configuration and diameter. Note that the lower most portion of tube 40 provides a fluid inlet 45 in the form of a plurality of perforations. The upper end portion of tube 40 forms a fluid outlet 46. Mounted within tube 40 is mixing propeller 48 which is rotatably moved during operation by shaft 49. A suitable motor 50 is also provided for supplying the necessary rotation to shaft 49 and can be mounted as shown in FIG. 2 upon tank top 25. Motor 50 would be any conventional electrical type motor for example having conventional electrical power supply through appropriate electrical conduit.

A plurality of ribs 55 mount to the top portion of tube 40 at fluid outlet 46 shroud 60. Shroud 60 provides a cylindrical shroud structure of substantially uniform diameter having upper 56 and lower 57 edges which are above and below respectively fluid outlet of tube 40.

Note also that shroud 60 is of a diameter greater than the diameter of tube 40 while tube 40 is of a diameter greater than that of injection conduit 35.

Propeller 48 is mounted within tube 40 as above described, below fluid outlet 46 and above fluid inlet 45 and preferably adjacent and above conduit discharge 36.

The general flow of fluid through conduit 35 as shown by arrows 66 in FIG. 2. Arrows 67 indicate the discharge of fluid from conduit 35 adjacent propeller 48.

It should be appreciated that propeller 48 will be rotated at a speed which urges fluid upwardly (as shown by arrows 67 in FIG. 2) a distance above fluid outlet 46 but preferably not above the upper edge 56 of shroud 60. Propeller 48 will be rotated at a speed which propels fluid particles upwardly and into the bore 61 of shroud 60 yet preferably not above edge 56. (Some floc particles may pass above edge 56). In this manner, the arrows 80 of FIG. 2 show the upward and downward path followed by fluid urged upwardly by propeller 48 and discharged at fluid outlet 46 of tube 40. With the use of chemicals to produce a floc it will be appreciated that floc material will move downwardly towards bottom 24 of tank 22 as shown by arrows 82 and be drawn back through perforation 46 of tube 40 upwardly. In this specification path, the floc will be built and made heavier as is desirable to remove impurities from the waste stream.

At the upper portion of tank 22 there can be seen a decant line "D" which represents generally a line above which clear supernatant liquid will collect and be discharged through weir outlet 85. In FIG. 2, arrows "S" indicates generally the discharge of supernatent from mixer 20.

In FIG. 1 there can be seen clarifier 100 which is comprised of a plurality of substantially vertical side walls 110 connected together by welding, for example.

Clarifier 100 provides an inlet weir-trough 88 which can provide for example a plurality of v-notches 89 as shown in FIG. 1. Weir-trough 88 is so designed that flow is evenly distributed over the width of clarifier 100.

A pair of clarifier sections 101, 102 is seen as comprising clarifier 100. Primary clarifier section 101 can be for example 18 feet long, 7½ feet wide and 8 feet deep. The bottom of clarifier section 101 is preferably sloped to the center which is V-shaped to accept mud. Baffle 130 which can be for example, a plurality of vertically deposed timber sections provides a suitable separator for clarifier sections 101, 102. Small spaces 131 will be preferably provided between timber sections 132 so as to allow the passage of some water therethrough in order to keep a constant fluid level, yet form a baffle to discourage short circuiting. Baffle 130 could be placed ten feet from weir-trough 88. In an exemplary tank 100, primary clarifier subsection as dimensioned in the above example is designed to pass 168 gallons per minute and have a retention time of 22 minutes. This design creates a rolling action of the floc to further enhance floc size and deposition of 60 to 70% of the floc on solids.

A constant water level is indicated at 140 in FIG. 1. Note that each clarifier section 101, 102 provides a network 120 of sludge collection pipes. Sludge pipe network 120 covers substantially the entire floor 115 of each clarifier section 101, 102. It will be understood that the plurality of pipes forming network 120 will collect sludge over the entire floor 115 of clarifier 100 and convey them to common discharges 125, as shown in FIG. 1. Floor 115 can be doubled as shown in FIG. 1 so as to urge sludge flow toward discharge 125 as is desirable.

Sludge is removed by the use of a blowoff valve through a four inch (4") outlet which outlet is designated as discharge 125. The sludge blowoff valves are two inches (2") in size and are blown off automatically by a sludge blowoff timer.

Water leaving the primary settling tank passes through wind baffle 130 and to secondary settling tank 102, which has for example a retention time of 40 minutes and measure as exemplary dimensions ten feet long by seven one-half feet wide by eight feet deep. As afore described with respect to subsection 101, subsection 102 likewise provides a sloping bottom for sludge removal.

At the extreme end portion of clarifier 100 opposite mixing tank 20, there can be seen decant discharge lines 150 which will remove the clarified clean water. Suitable piping can be attached at discharges 150 as desired.

Figure 3:
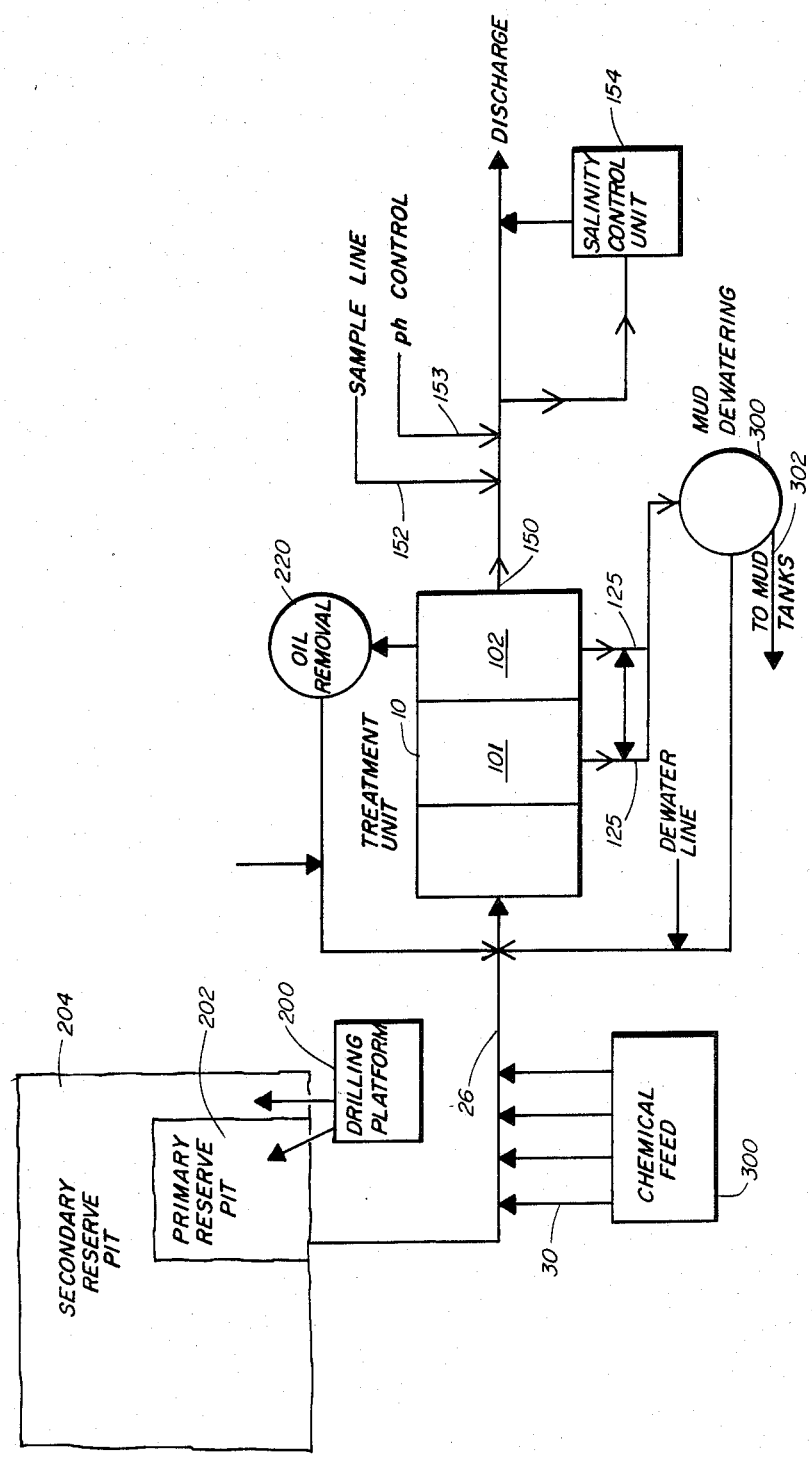
FIG. 3 is a schematic flow diagram of the preferred embodiment of the apparatus of the present invention.

FIG. 3 provides a schematic diagram of the waste treatment of the present invention as preferably used to treat reserved pit water from a drilling platform. In FIG. 3, drilling platform is shown as discharging waste into primary reserve pit 202 which overflows into secondary reserve pit 204. At this point, some solid removal takes as is desirable. Chemical feed 300 is shown as injecting desirable treatment chemicals through the plurality of lines 30 into waste inlet line 26. Chemical injection lines 30 and waste inflow line 26 are both shown also in FIG. 1.

Treatment unit 10 is also seen in FIG. 3 into which the waste stream is emptied. A suitable oil removal unit could be provided as shown in FIG. 3 with oil removal 220 station being schematically illustrated for removing floating oil from treatment unit 10 and returning it to inflow line 26. Sludge discharge lines 125 are schematically illustrated as removing sludge from clarifier subsections 101, 102.

In the removal of drilling mud from the waste stream as will commonly be the case in the removal of impurities and like solid material from drilling platform waste water, a mud dewatering 300 station is shown having a mud return line 302 for salvaging drill mud as is desirable. Drilling mud, it should be understood, is a very expensive commodity and with the apparatus and method of the present invention, such drilling mud can be removed from normally a waster stream thus saving money for the owner of the drilling platform as well as enhancing the quality of the environment by removing this solid material from water before it is discharged. Discharge 150 line is shown in FIG. 3 with sample line 152, pH control 153, and salinity control 154 also being schematically shown as desirable features before discharging the treated water into the environment or returning it to the drilling platform for use in washdown operations, etc.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A self-contained, transportable waste treatment apparatus comprising:
   a. an elongated, transportable, structural sled;
   b. a fluid inlet discharging into the bottom of at least one mixing tank at one end of the sled for supplying a waste stream containing a chemical enhancing the formation for floc thereto;
   c. a hollow tube disposed vertically within the tank and surrounding the inlet, and means for circulating fluid through and around the tube so that the circulating fluid discharges from the top of the tube and then circulates around the tube in a direction which returns the fluid into the bottom of said tube to the area adjacent the inlet;
   d. a plurality of vertically standing intersecting walls disposed about the periphery of the sled to define a settling tank on the sled;
   e. outlet means at the end of the settling tank opposite the mixing tank for removing supernatent liquid from the settling tank so that flow proceeds through the tank in a general direction from the fluid inlet to the outlet means;
   f. a plurality of vertically disposed baffle sections with small spaces therebetween forming a baffle structure extending from the top to the bottom of said settling tank that is placed interiorly of the settling tank transverse to the direction of flow, dividing the settling tank into primary and secondary sections, said spaces allowing the passage of water therethough to maintain a constant fluid level in said settling tank while enhancing floc size and solids deposition;
   g. inlet wier means for transmitting supernatant liquid from the mixing tank to the primary section of the settling tank; and
   h. sludge drawoff means supported by the sled and disposed at the lower portion of the settling tank for removing settled sludge material from the primary and the secondary sections of the settling basin.

2. The self-contained transportable waste treatment apparatus of claim 1 further comprising lifting eye means for lifting the pad.

3. The self-contained transportable waste treatment apparatus of claim 1 further comprising sludge concentration means connectable to the sludge drawoff means for dewatering sludge removed from the settling tank.

4. The self-contained transportable waste treatment apparatus of claim 1 wherein there are two mixing tanks mounted on the sled and flow proceeds sequentially from one mixing tank to the second mixing tank before entering the inlet weir means.

5. The self-contained transportable waste treatment apparatus of claim 4, wherein the first and second mixing tanks are sequentially connected by a flow line from the top of the first tank to the bottom of the second tank.

6. The self-contained transportable waste treatment apparatus of claim 1 wherein the weir means comprises a weir laterally extending across the top of one end of the upper portion of the settling tank with a weir discharge transmitting fluid to the settling tank primary section with a stream that extends across the tank width.

7. The self-contained transportable waste treatment apparatus of claim 1, wherein the sled is generally rectangular.

8. The self-contained transportable waste treatment apparatus of claim 1 wherein the horizontal cross section of the settling tank is rectangular corresponding with the surface area of the sled.

* * * * *